United States Patent
Fosburgh et al.

(10) Patent No.: US 9,043,402 B2
(45) Date of Patent: May 26, 2015

(54) PUBLICATION OF EQUIPMENT STATUS

(75) Inventors: Bryn Allen Fosburgh, Longmont, CO (US); George Derrick Darby, Marble Hill, GA (US); Omar Soubra, Westminster, CO (US); James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 504 days.

(21) Appl. No.: 13/235,713

(22) Filed: Sep. 19, 2011

(65) Prior Publication Data

US 2013/0073605 A1    Mar. 21, 2013

(51) Int. Cl.
| | |
|---|---|
| G06F 15/16 | (2006.01) |
| G06F 3/048 | (2013.01) |
| G06F 11/30 | (2006.01) |
| G06F 11/32 | (2006.01) |

(52) U.S. Cl.
CPC .......... *G06F 11/3013* (2013.01); *G06F 11/326* (2013.01); *G06F 11/324* (2013.01); *G06F 11/3055* (2013.01)

(58) Field of Classification Search
USPC ............. 709/205, 217–218; 701/33; 715/751, 715/753, 771, 769
See application file for complete search history.

(56) References Cited

U.S. PATENT DOCUMENTS

| | | | |
|---|---|---|---|
| 6,434,455 B1 * | 8/2002 | Snow et al. ................... 701/31.4 |
| 7,526,436 B2 | 4/2009 | Brown | |
| 7,565,332 B2 | 7/2009 | Williams et al. | |
| 7,685,084 B2 | 3/2010 | Sisk et al. | |
| 7,720,835 B2 | 5/2010 | Ward et al. | |
| 7,765,259 B2 | 7/2010 | MacVarish | |
| 7,774,348 B2 | 8/2010 | Delli Santi et al. | |
| 7,783,624 B2 | 8/2010 | Martinez et al. | |
| 7,788,252 B2 | 8/2010 | Delli Santi et al. | |
| 7,805,450 B2 | 9/2010 | Delli Santi et al. | |
| 7,849,149 B2 * | 12/2010 | Habaguchi et al. ........... 709/207 |
| 2005/0183028 A1 * | 8/2005 | Clough et al. ................ 715/771 |
| 2008/0084324 A1 | 4/2008 | Wallace et al. | |
| 2008/0084332 A1 | 4/2008 | Ritter et al. | |
| 2008/0084333 A1 | 4/2008 | Forrest et al. | |
| 2008/0084334 A1 | 4/2008 | Ballew | |
| 2008/0086320 A1 | 4/2008 | Ballew et al. | |
| 2008/0086321 A1 | 4/2008 | Walton | |
| 2008/0086322 A1 | 4/2008 | Wallace | |
| 2008/0086323 A1 | 4/2008 | Petrie et al. | |
| 2008/0086349 A1 * | 4/2008 | Petrie ............................... 705/7 |

(Continued)

OTHER PUBLICATIONS

Digi International Inc (2011) "Digi Fleet: Rugged Solutions for Mobile Asset Track and Telematics" Available Web Site: www.digi.com/fleet; accessed on Oct. 5, 2011, 2 pages.

(Continued)

*Primary Examiner* — Aftab Nasir Khan
(74) *Attorney, Agent, or Firm* — Swanson & Bratschun, L.L.C.

(57) ABSTRACT

This disclosure concerns novel tools and techniques for distributing status information, including without limitation status information about commercial equipment. In some cases, a status monitoring device can be attached to, incorporated within, or otherwise placed in communication with a piece of commercial equipment. The status monitoring device can monitor the status of the equipment and communicate that status. Some of the discloses tools and techniques employ a social networking infrastructure to convey information (such as status information about a piece of equipment).

28 Claims, 7 Drawing Sheets

(56) References Cited

U.S. PATENT DOCUMENTS

| | | | |
|---|---|---|---|
| 2008/0086391 A1 | 4/2008 | Maynard et al. | |
| 2008/0086427 A1 | 4/2008 | Wallace | |
| 2008/0086428 A1 | 4/2008 | Wallace | |
| 2008/0086497 A1* | 4/2008 | Wallace et al. | 707/102 |
| 2008/0086508 A1 | 4/2008 | Ballew | |
| 2008/0086509 A1 | 4/2008 | Wallace | |
| 2008/0086685 A1 | 4/2008 | Janky et al. | |
| 2010/0211868 A1* | 8/2010 | Karmarkar et al. | 715/234 |
| 2011/0087662 A1 | 4/2011 | Darby, Jr. et al. | |
| 2011/0087984 A1* | 4/2011 | Jitkoff et al. | 715/769 |
| 2011/0130916 A1* | 6/2011 | Mayer | 701/33 |
| 2011/0154223 A1* | 6/2011 | Whitnah et al. | 715/753 |
| 2011/0252095 A1* | 10/2011 | Cypes et al. | 709/205 |
| 2012/0314620 A1* | 12/2012 | Ralston | 370/254 |
| 2013/0031487 A1* | 1/2013 | Olsen et al. | 715/751 |

OTHER PUBLICATIONS

U.S. Appl. No. 13/247,788, filed Sep. 28, 2011 entitled "Collaborative Sharing Workgroup," by Snoeck et al., 32 pages.

U.S. Appl. No. 13/149,364, filed May 31, 2011 entitled, "Method and System for Exchanging Data," by Hamilton et al., 70 pages.

* cited by examiner

PUBLICATION OF EQUIPMENT STATUS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to communication systems, and more particularly, to novel tools and techniques for distributing information about the status of commercial equipment.

BACKGROUND

One issue that many businesses face is the need to obtain information about the status of equipment. This issue applies to many different kinds of commercial equipment. Merely by way of example, some organizations need to obtain status information (e.g., current location, maintenance status, etc.) about vehicles (e.g., in a commercial fleet). Other organizations might need to determine whether unattended equipment is operating normally (or at all). In other cases, even attended equipment might need to convey status information remotely; for example, if an operator of the equipment does not have the ability or incentive to report information about the status of the equipment (for example, if the equipment is leased to the operator).

In the past, obtaining status information about equipment was a labor-intensive process that generally involved travel to the location of the equipment and manual inspection of the equipment. As many types of equipment gained processing power, the accumulation of status information about the equipment became more automated, but the collection of that information often remain difficult, especially for equipment located in remote locations. Some equipment manufacturers developed proprietary communication hardware and/or protocols for conveying status information remotely, but in multivendor environments, these disparate strategies often prove unworkable.

More recently, especially in the field of information technology, there have been movements toward standardizing the communication of status information. One example of such a movement is the simple network management protocol ("SNMP"), which is commonly used to convey status information about network equipment. Even such standards, however, generally are limited in application to information technology equipment, and they often require significant infrastructure (such as network monitors and the like) in order to convey status information from a piece of equipment to the ultimate consumer of such information (which might be a user, a back office system, and/or the like).

Thus, there is a need for new tools and techniques to provide for the conveyance of status information from a wide variety of different types of commercial equipment to a consumer of such information.

BRIEF SUMMARY

Certain embodiments provide novel tools and techniques for distributing status information, including without limitation status information about commercial equipment. In a set of embodiments, a status monitoring device can be attached to, incorporated within, or otherwise placed in communication with a piece of commercial equipment. A wide variety of different types of commercial equipment can be supported in accordance with various embodiments. The status monitoring device can include any components that are necessary or beneficial to determining the status of the equipment and/or communicating the status. The status monitoring device, then, can monitor the status of the equipment and communicate that status in accordance with the techniques described herein.

For instance, in a novel aspect, some embodiments can take advantage of a social networking infrastructure to convey information (such as status information about a piece of equipment). In some aspects, the use of a social networking infrastructure can provide numerous advantages over conventional communication channels for equipment status information. Merely by way of example, in one aspect, a social networking infrastructure can be ubiquitous: Depending on the implementation, a social networking infrastructure can be accessed by any device capable of running a thin client (or even sending a simple message, such as an e-mail message, text message, and/or the like) and/or communicating using Internet protocol.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a system provided by one set of embodiments comprises a first computer system and a second computer system. The first computer system comprises a first processor and a first computer readable storage having encoded thereon a status monitoring component to program the first computer system to perform one or more operations. In an aspect, the status monitoring program might include a first set of instructions executable by the first processor. The first set of instructions might comprise instructions for determining a status of a piece of commercial equipment and/or instructions for publishing a status update, using a social networking infrastructure. The status update might indicate the status of the piece of commercial equipment; and The second computer system might comprise a second processor and a second computer readable storage medium. The second computer readable storage medium might have encoded thereon a status update component to program the second computer system to perform one or more operations. In an aspect, the status update program might include a second set instructions executable by the second processor.

Merely by way of example, the second set of instructions might comprise instructions for receiving user input identifying the piece of commercial equipment and/or instructions for subscribing to updates from the piece of commercial equipment. The second set of instructions might further comprise instructions for receiving the published status update via the social networking infrastructure, based on a subscription to the piece of commercial equipment. The second set of instructions might also feature instructions for taking an action in response to receiving the published status update.

A method in accordance with a set of embodiments might comprise determining, with a computer system, a status of a piece of commercial equipment. The method might further include accessing, with the computer system, a social networking infrastructure. In some embodiments, the method further comprises publishing a status update, with the computer system, using the social networking infrastructure. In an aspect, the status update can indicate the status of the piece of commercial equipment.

A method in accordance with another set of embodiments might comprise a computer subscribing, with a social networking architecture, to updates from a piece of commercial equipment. The method might further comprise receiving a published status update via the social networking infrastructure, based on a subscription to the piece of commercial equipment, and/or taking an action in response to receiving the published status update.

An apparatus in accordance with yet another set of embodiments might comprise a computer readable medium having encoded thereon a set of instructions executable by one or more computers to perform one or more operations. In one aspect, the set of instructions might comprise instructions to implement one or more methods provided by various embodiments.

A computer system for providing status updates (e.g., status updates about a piece of commercial equipment) might comprise a processor and a computer readable medium having encoded thereon a status monitoring component to program the computer system to perform one or more operations. In an aspect, the status monitoring component might comprise a set of instructions executable by the processor.

The set of instructions might include, for example, instructions for determining a status of the piece of commercial equipment. The set of instructions might further comprise instructions for accessing a social networking infrastructure, and/or instructions for publishing a status update using the social networking infrastructure. In an aspect, the status update might indicate the status of the piece of commercial equipment.

A computer system for receiving status updates (e.g., status updates from or about a piece of commercial equipment) might also comprises a processor and a computer readable medium. The computer readable medium might have encoded thereon a status update component to program the computer system to perform one or more operations. The status update component might comprise a set of instructions executable by the processor.

Merely by way of example, the set of instructions might comprise instructions for subscribing, with a social networking architecture, to updates from the piece of commercial equipment. The set of instructions might further comprise instructions for receiving a published status update via the social networking infrastructure, based on a subscription to the piece of commercial equipment. In some embodiments, the set of instructions further comprises instructions for taking an action in response to receiving the published status update.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
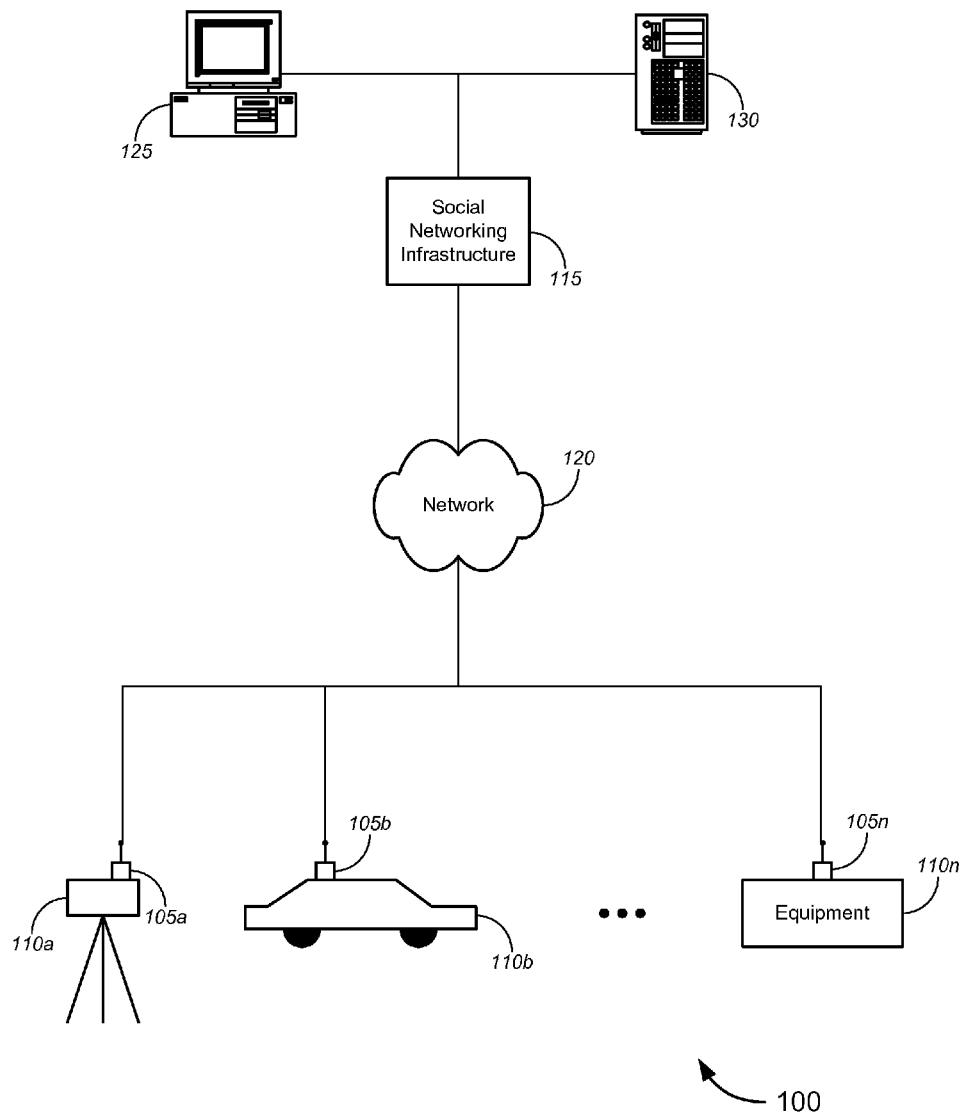
FIG. 1 is a block diagram illustrating a system for providing status updates, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments provide novel tools and techniques for distributing status information, including without limitation status information about commercial equipment. In a set of embodiments, a status monitoring device can be attached to, incorporated within, or otherwise placed in communication with a piece of commercial equipment. A wide variety of different types of commercial equipment can be supported in accordance with various embodiments. The status monitoring device can include any components that are necessary or beneficial to determining the status of the equipment and/or communicating the status. Merely by way of example, in some cases, the status monitoring device might include a sensor (the nature of which can depend on the type of equipment being monitored), a processor in a computing system, and/or a communication interface. The status monitoring device, then, can monitor the status of the equipment and communicate that status in accordance with the techniques described herein.

For instance, in a novel aspect, some embodiments can take advantage of a social networking infrastructure to convey information (such as status information about a piece of equipment). In some aspects, the use of a social networking infrastructure can provide numerous advantages over conventional communication channels for equipment status information. Merely by way of example, in one aspect, a social networking infrastructure can be ubiquitous: Depending on the implementation, a social networking infrastructure can be accessed by any device capable of running a thin client (or even sending a simple message, such as an e-mail message, text message, and/or the like) and/or communicating using Internet protocol.

In accordance with certain embodiments, the use of a social networking infrastructure as transport can provide advantages over traditional techniques for communicating status updates. Merely by way of example, rather than requiring the use of expensive, proprietary hardware and/or access methodologies, the use of the social networking infrastructure provides a cost-effective solution to allow status updates from any device that can access a public network, such as the Internet. Thus, in some aspects, the publication of status updates through a social networking infrastructure can provide a cost-effective, scalable solution that can avoid the need to employ specialized communication infrastructure or proprietary communication hardware and software.

Different embodiments can be used to convey a wide variety of status information, the communication of which is described herein as a "status update." The terms, "status information" and "status update," are used broadly herein to describe any type of data or information that pertains to the status of a monitored piece of equipment. The nature of the status information often will vary depending upon the type of equipment being monitored. Merely by way of example, the status of mobile equipment (including without limitation vehicles) often might include the location of such equipment, whether such equipment is currently in motion, the present and/or historical velocity of the equipment, and/or whether such equipment has moved over certain interval (e.g., since a prior status update); conversely, location information might not be particularly useful with respect to fixed equipment, and in such a case location information might not be monitored or conveyed. In other cases, status information might include operational information about the equipment, such as information about a duration of use (e.g., in total, over a particular interval of time, etc.), information about whether the equipment currently is in use, information about an operational status of the equipment (e.g., optimal, sub optimal, or non-operational), information about equipment-specific parameters, and/or the like. In an embodiment, data regarding a maintenance request, based on duration of machine operation, can be placed by the equipment itself in a message to a maintenance logger associated with servicing the equipment. Alternatively, a maintenance request may be based on detection of parameter threshold being exceeded, as measured on the equipment by a built-in monitor system. Such maintenance requests can be considered status updates as well.

A few specific examples can illustrate some of the wide variety of status information that can be monitored and/or conveyed by different embodiments. If, for example, the monitored equipment is a survey instrument, such as a Total Station™ (several varieties of which are available from Trimble Navigation™), status information might include a current location (which may be expressed, e.g., as GNSS coordinates) of the Total Station, and/or a set of one or more past locations of the Total Station.

Alternatively and/or additionally, the status information might include an indicator of the operational status of the Total Station; such an indicator might indicate whether the Total Station is completely operational, has limited operational capability (and/or diagnostic information about such limitations, which could include, merely by way of example, an indication of misconfigured and/or nonoperational components). In other cases the status information might indicate a current operating mode or active function of the Total Station, including, for example, whether and/or how the Total Station is in use at the time of the status update.

In some cases (such as in the case of a Total Station), if the equipment includes instrumentation and/or processing capabilities, the status information might include output from the equipment itself, such as output from the instrumentation and/or processor of the equipment. Merely by way of example, if a Total Station is used to determine the location of a measured point, the status information could include one or more recently determined locations (along with any other suitable information, such as identifiers of the measured points, etc.).

As another example, some embodiments might be configured to monitor and convey the status of a vehicle. Because a vehicle is mobile, status updates about a vehicle might include location updates (which could be published periodically, based on proximity to or distance from particular locations, etc., published on demand from an operator of the vehicle, etc.). Such updates could be in the form of coordinates (such as GNSS coordinates, latitude-longitude coordinates, etc.), addresses, etc. In an aspect, certain embodiments can be used to monitor construction vehicles (e.g., heavy construction equipment, such as excavators, tractors, earthmovers, etc.), vehicles within a fleet (in which the system can be used to monitor and track a plurality of such vehicles), and/or the like.

In some embodiments, status updates for a vehicle can include other information as well. Merely by way of example, in some cases, the status update system might have access to vehicle operating parameters. Such access can be provided by sensors in direct communication with vehicle systems such as fuel feed systems, speedometer/odometer systems, etc. Alternatively and/or additionally, the status update system might establish communication with a vehicle data bus, using, for example, the OBDII standard that is common among passenger vehicles and/or any other standard or proprietary vehicle communication system. Vehicle operating parameters can include a variety of parameters, such as fuel consumption data, fuel volume data, emissions data, vehicle speed and/or acceleration (either averaged over some period or as a snapshot), activation of vehicle warning or emergency systems (e.g., airbag, anti-lock brakes, "check engine" lights, etc.). A variety of vehicle operating parameters are disclosed in commonly assigned, co-pending U.S. Patent Application Publication No. 2011/0184784 A1, the disclosure of which is incorporated herein by reference. Vehicle status updates can also include information about the operational status of the vehicle (e.g., operating normally, any indications of suboptimal operation, etc.). Based on these examples, one skilled in the art can appreciate that virtually any information about a vehicle, it's location, and/or it's travel can be provided as a status update in accordance with various embodiments.

As another example, status updates can comprise asset tracking information. For instance, commonly assigned U.S. Patent Application Publication No. 2010/0265061 A1, the disclosure of which is incorporated by reference, discloses a number of systems and methods for asset management. Such systems can be integrated with the status update techniques described herein. Merely by way of example, a mobile asset tracking system can be configured to publish, in accordance with the embodiments described herein, status updates comprising asset tracking data for any tracked assets. In another aspect, the status updates described herein can be used as the transport for a mobile asset tracking system to provide asset tracking data to an asset tracking computer system, as described in the incorporated application.

As a further example, commonly assigned U.S. patent application Ser. No. 12/902,013, filed Oct. 11, 2010 by Hamilton et al., the disclosure of which is incorporated herein by reference, discloses systems for monitoring agricultural carbon. The status update techniques described herein can be used to monitor (and report status on) various components of the carbon monitoring systems described in that application, such as the mobile units and/or the vehicles associated with those mobile units. Additionally and/or alternatively, the status update techniques described herein can be used to transport carbon monitoring data obtained or created by the mobile units disclosed in that application to the carbon tracking server systems in that application (which can be considered back office systems or applications in accordance with the embodiments disclosed herein).

As yet another example, commonly assigned U.S. patent application Ser. No. 13/095,673, filed Apr. 27, 2011 by Fosburgh et al., the disclosure of which is incorporated herein by reference, discloses systems for monitoring railway track geometry. The status update techniques described herein can be used to monitor (and report status on) various components of the track monitoring systems described in that application. Additionally and/or alternatively, the status update techniques described herein can be used to transport track monitoring data obtained or created by the track monitoring systems disclosed in that application a remote server system for processing (and the remote server system could also be considered a back office system or could run a back office application in accordance with the embodiments disclosed herein).

As can be seen from the preceding examples, the scope and variety of machinery suitable for use by such a data collection and information distribution system is large. To list a few more examples, safety management in hazardous operations could be improved by this system via status updates to indicate hazardous condition detection. Crane operations, agricultural operations, manufacturing operations, earth moving, construction, shipping, mobile chemical/fuel discharge/unloading, dredging, all can benefit from simple messaging systems as described herein. Thus, virtually any type of status updates, from virtually any type of equipment, can be supported by various embodiments, and these examples should not be considered limiting.

Turning now to the figures, FIG. 1 is a block diagram illustrating a system 100 for providing status updates, in accordance with various embodiments. The system 100 comprises one or more status monitoring devices 105. In an aspect, each status monitoring device 105 monitors and publishes updates on the status of a particular piece of commercial equipment 110, although there does not necessarily need to be a one-to-one relationship between a status monitoring device 105 and a piece of commercial equipment 110. For example, a single piece of commercial equipment 110 might be monitored by multiple status monitoring devices 105, and/or a single status monitoring device 105 might monitor multiple pieces of commercial equipment 110.

As illustrated by FIG. 1, however, in a typical case, each piece of equipment 110 will have associated therewith its own status monitoring device 105. While the system 100 of FIG. 1 features three pieces of commercial equipment, a piece of surveying equipment 110a (e.g., a Total Station), a vehicle 110b, and a generic piece of commercial equipment 110n (each having an associated status monitoring device 105a, 105b, 105n, respectively), various embodiments might include any number of status monitoring devices 105 and associated commercial equipment 110.

Figure 2:
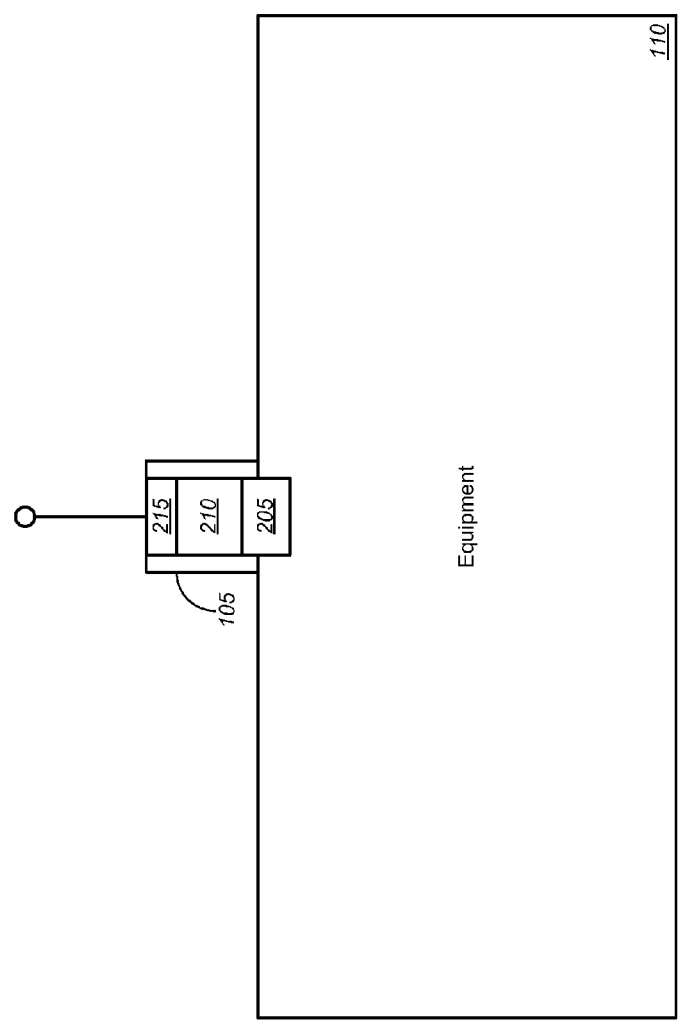
FIG. 2 is a block diagram illustrating a device for publishing status updates, in accordance with various embodiments.

FIG. 2 provides a more detailed depiction of an exemplary status monitoring device 105. The illustrated device 105 comprises a sensor 205 that is configured to monitor the status of the equipment 110. The nature of the sensor 205 often will depend on the type of equipment 110 that is being monitored and/or on the nature of the status information that is being monitored. Merely by way of example, in cases in which the location of the equipment 110 is to be monitored, the sensor 205 might include a position measurement device, such as a global navigation satellite system ("GNSS") receiver, and/or an interface to a position measurement device incorporated within the equipment 110 itself. As another example, if the equipment 110 includes a processing system, the sensor 205 might include an interface to provide communication between the status monitoring device 105 and the processing system of the equipment 110. In yet other cases, the sensor 205 might provide direct measurement of one or more conditions of the equipment 110 (such as operating temperature, spatial orientation, velocity, electrical input, and/or the like) and/or ambient conditions (such as ambient temperature/humidity, current time, and/or the like).

In some cases, the sensor 205 is incorporated directly within the status monitoring device 105. Additionally and/or alternatively, the sensor 205 might be incorporated within the equipment 110 itself (e.g., as original equipment and/or as an aftermarket modification); in such cases, the status monitoring device 105 might include an interface to communicate with the sensor(s) incorporated within the equipment 110 itself. Merely by way of example, a vehicle equipped with a diagnostic system might include a plurality of sensors (such as fuel flow sensors, velocity sensors, emissions sensors, and/or the like), and rather than duplicating the functionality of these sensors, the status monitoring device 105 might instead be equipped to interface with the vehicle diagnostic system itself (e.g., using a standard interface such as the OBDII interface and/or a proprietary interface). In other embodiments, the sensor 105 might be separate from the status monitoring device 105 and the equipment 110 and/or might be in communication with either (or both) the monitoring device 105 and the equipment 110 using appropriate interfaces, which could include, without limitation, standard interfaces (such as USB interfaces, Ethernet interfaces, serial interfaces, wireless interfaces such as Bluetooth interfaces, WiFi interfaces, etc.) and/or proprietary interfaces.

In the illustrated embodiment, the status monitoring device 105 further comprises a processing system 210 in communication with the sensor 205 and a communication interface 215 in communication with the processing system 210. In an aspect, the processing system 210 receives data from the sensor 205 and/or directly from the equipment 110 and performs any necessary processing to interpret, condition, and/or format the received data. In an embodiment, the processing system 210 also publishes and/or otherwise transmits an equipment status update, e.g., using the communication interface 215. As described in further detail below, the equipment status update might comprise and/or be derived from the data received by the processing system 210 from the sensor 205 and/or the equipment itself.

Figure 6:
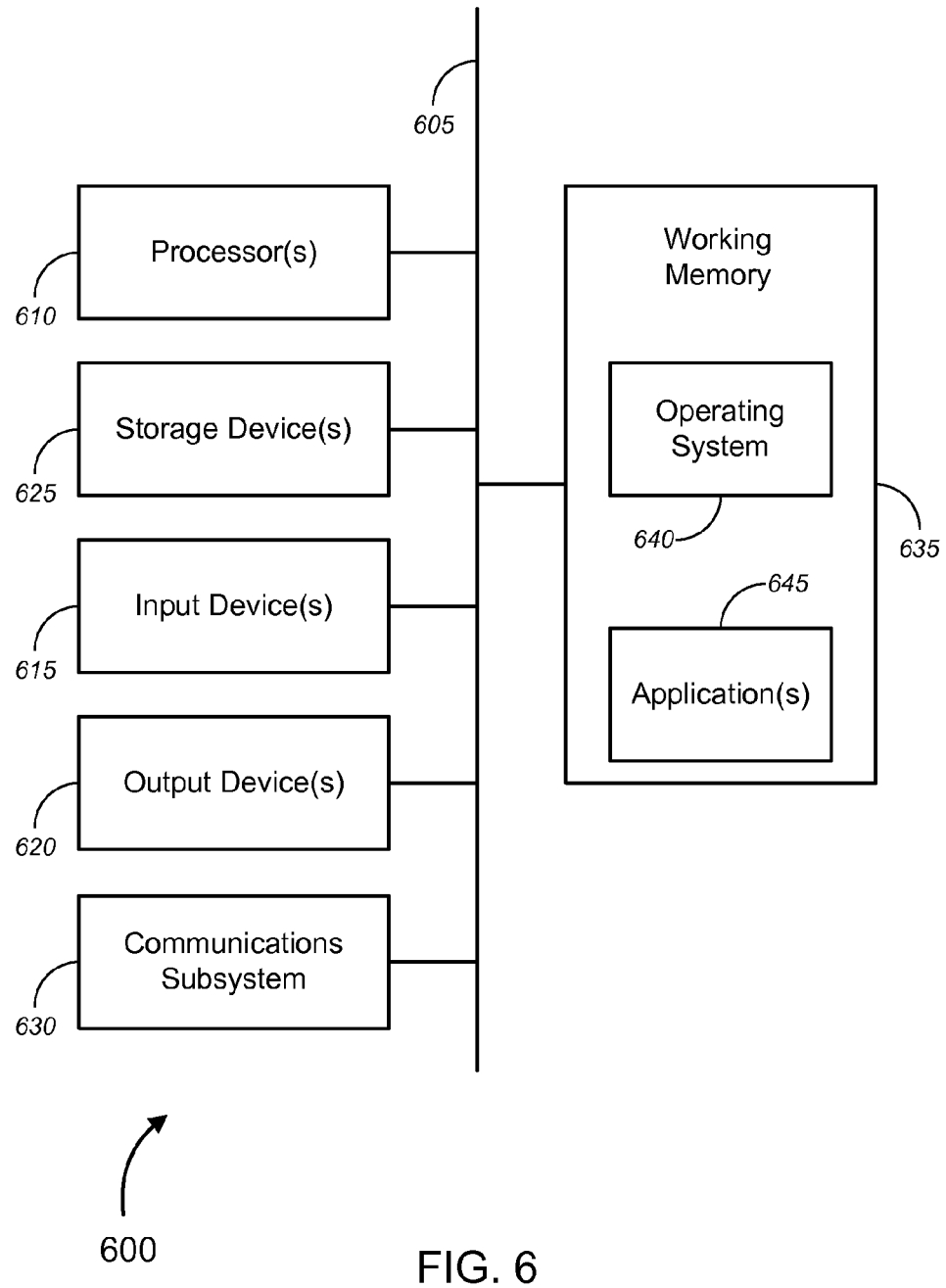
FIG. 6 is a generalized schematic diagram illustrating a computer system, in accordance with various embodiments.

In an aspect, the processing system 210 might be a computer system, a generic example of which is illustrated by FIG. 6 and described in further detail below. In other embodiments, the processing system 210 might comprise an embedded processor with firmware instructions, a system on a chip ("SOC"), and/or the like. Any suitable processing system 210 may be employed so long as it is capable of performing the functionality described herein. The processing system 210, in an aspect, includes a status monitoring component (which can include hardware, firmware, or software instructions) that program the processing system to operate with the functionality described herein. As illustrated, the processing system 210 is incorporated within the status monitoring device 105. In alternative embodiments, the processing system 210 might be incorporated within the equipment 110 itself and/or separate from (and/or in communication with) the equipment 110 and the status monitoring device 105.

The communication interface 215 can comprise any appropriate communication hardware and/or software to transmit the equipment status updates. Merely by way of example, in some cases, the communication interface 215 will include a wireless radio (such as a CDMA radio, a GSM radio, a WiFi radio, and/or the like). In other cases, the communication interface 215 might include a wired interface, such as an Ethernet port and associated chipset. (In one aspect, the communication interface 215 might be provided by a communication subsystem of the processing system 210; such a communication subsystem is described in further detail below in relation to FIG. 6.) In some embodiments, in addition to providing communication with external devices (e.g., in order to publish equipment status updates), the communication interface 215 might also provide communication between the processing system 210 and the sensor 205 and/or the equipment 110 as necessary.

In some embodiments, the communication interface 215 can also be used to receive information, such as instructions for the processing system 210, e.g., instructions about what data to collect, what type(s) of status update(s) to transmit, when to collect data and/or transmit updates, and/or the like. In particular cases, the processing system 210 might be configured to communicate with the equipment 110 in order to control some aspects of the operation of the equipment 110; thus, the communication interface 215 might function to receive instructions for controlling operation of the processing system 210 and/or the equipment 110 itself.

The relationship between a status monitoring device 105 and the commercial equipment 110 that it monitors can vary according to the nature of the equipment 110 and/or the status monitoring device 105. Merely by way of example, in some cases, the equipment 110 might not be adapted to communicate with the status monitoring device 105. In such cases, the status monitoring device might monitor conditions independent of the equipment, such as the position and/or velocity of the status monitoring device 105 (which could be obtained from a position system incorporated within the status monitoring device 105, for example), the ambient temperature or other ambient environmental conditions in proximity to the equipment (which could be obtained by thermal sensors and the like incorporated within the status monitoring device), etc.

In other embodiments, the status monitoring device 105 might include (and/or might be in communication with) one or more sensors 205 that have been retrofit to the equipment 110. Such sensors could include internal thermal sensors to detect an operating temperature of the equipment 110 (and/or various components thereof), a power sensor placed inline with the power circuit of the equipment 110 to detect whether the equipment 110 is powered on, and/or the like.

In still other cases, the equipment 110 might include an interface for communicating with the status monitoring device 105 and/or one or more sensors thereof. Such an interface might be specialized for use with a status monitoring device 105 and/or might be a standard interface (such as the OBDII interface described above), with which the status monitoring device 105 (and/or a sensor thereof) might be configured to communicate using standard protocols. In yet other cases the equipment 110 might be manufactured and/or retrofit with an integrated status monitoring device 105. Based on these examples, one skilled in the art should understand that a wide variety of relationships can exist between various equipment 110 and associated status monitoring devices 105, and that the scope of various embodiments should not be considered limited to any particular relationship, so long as the status monitoring device 105 can obtain the desired data and provide status updates as described further herein.

Returning to FIG. 1, the system 100 might further comprise a social networking infrastructure 115. In an aspect, the social networking infrastructure 115 can be any combination of hardware and software that provides a social networking environment for users. The terms, "social network," and its derivatives are used broadly herein to refer to any environment that allows for interaction between multiple entities (which typically will be users, but in accordance with embodiments described herein might also be status monitoring devices 105 and/or computer systems that act as consumers of information published by status monitoring devices 105). Examples of social networks can include, but are not limited to web sites (or other facilities) that facilitate connections between users (such as Facebook, LinkedIn, and the like), web-based blogs and microblogs, text message transmission systems (including Internet forums, chat faculties, instant messaging facilities, short message service ("SMS") facilities and the like), push-based information transmission systems (such as resource description framework site summary ("RSS") feeds, Twitter feeds, and the like), and similar technologies.

Certain embodiments might employ a social networking infrastructure that standardized and/or available to the public (such as a public microblog, Twitter feed, and/or the like) as a transport to publish status updates. Other embodiments might employ a private and/or proprietary social network infrastructure as such a transport. In some cases, a private social network infrastructure can be an infrastructure that is not available to the public in general, either by limiting physical or logical access to the infrastructure through firewalls, etc., or through implementing access control mechanisms to prevent unauthorized access to the infrastructure.

In accordance with FIG. 1, the system 100 includes a network 120 to provide communication between the status monitoring devices 105 and other components of the system 105 (and in particular the social networking infrastructure 115). The network 120 can be a wired network, wireless network, and/or a combination thereof. In some embodiments, the network 120 might be a public network, such as the Internet, a public switched telephone network ("PSTN"), a public wireless network, and/or the like. In other embodiments, the network 120 might comprise a private network (and/or a virtual private network ("VPN")). In an aspect, the network 120 might comprise a plurality of interconnected networks (each of which can be of any format—wired or wireless—and can be public or private). Virtually any configuration of the network 120 is possible, so long as it provides communication between the status monitoring devices 105 and the social networking infrastructure 115.

It should be appreciated that the social networking infrastructure 115 may be integrated with the network 120. Merely by way of example, a web site on the Internet might be used as the social networking infrastructure 115. Alternatively and/or additionally, the social networking infrastructure 115 might be separate from (but in communication with) the network 120.

The system 100 also includes a client computer 125, which can be used, as described in further detail below, to receive published status updates. The client computer is in communication with the social networking infrastructure 115, though which the updates are received. Although, for ease of illustration, the client computer 125 may instead communicate with the social networking infrastructure 115 through the network 120. In different embodiments, the client computer can be a personal computer, a tablet computer, a handheld computer, a smart phone, and/or the like.

The client computer 125 might execute a software program (such as a status update component) to receive and/or display status updates, and/or take one or more actions in response to receiving the status updates, as described in further detail below. In one aspect, this software program might provide for the user a corporate dashboard environment, as described in further detail below. In some cases, software program might be a dedicated client application that is configured specifically to receive status updates from the social networking infrastructure 115. In other cases, a general-purpose program, such as a web browser, RSS feed reader, and/or the like might be used to receive and or display status updates. Based on the disclosure herein, it should be appreciated that a wide variety of hardware and/or software configurations can be employed to serve as the client computer 125, so long as they can perform the functions described herein with respect to that device.

In an aspect, the client computer 125 comprises a user interface. The user interface allows users to interact with the client computer 125. A variety of user interfaces may be provided in accordance with various embodiments, including without limitation graphical user interfaces that display, for a user, display screens for providing information to the user and/or receiving user input from a user. (An example of one such display screen is described below with respect to FIG. 5.)

Merely by way of example, in some embodiments, social networking infrastructure 115 may be configured to communicate with the client computer 125 via a dedicated application running on the client computer 125; in this situation, the user interface might be displayed by the client computer, based on data and/or instructions provided by the social networking infrastructure 115. In this case, providing the user interface might comprise providing instructions and/or data to cause the client computer to display the user interface. In other embodiments, the user interface may be provided from a web site, e.g., by providing a set of one or more web pages, which might be displayed in a web browser running on the client computer 125 and/or might be served by a web server (not shown on FIG. 1). In various embodiments, the social networking infrastructure 115 might comprise the web server and/or be in communication with the web server, such that the social networking infrastructure 115 provides data (e.g., status updates) to the web server to be incorporated in web pages served by the web server for reception and/or display by a browser at the client computer 125.

In some embodiments, the system 100 further comprises a back office system 130. In an aspect, the back office system 130 can be a server computer system that runs one or more of a variety of back office applications. Such back office applications can include, but are not limited to enterprise resource planning applications, customer relations management applications, supply chain management applications, business application suites, accounting applications, and/or the like. One type of back office application is a visual organizer system, as described below; another type of back office application is often described as an enterprise application or an enterprise application suite. Such enterprise applications are available from providers such as Oracle™, SAP™, and the like. Back office applications are often database driven. In accordance with some embodiments then, the back office system 130 can receive status updates from the social networking infrastructure 115, with which the back office system is in communication (e.g., directly, through the network 120, through the client computer 125, etc.). Thus, in accordance with these embodiments, a status that they can be used to update a back office application (e.g., by updating data in a database used by the back office application, by providing updated data directly to the back office application, and/or the like).

Merely by way of example, a piece of equipment 110 might be leased, and the billing arrangement for the leased equipment 110 might include billing based on the duration of use of the equipment. In this situation, a status monitoring device 105 that monitors the status of the equipment 110 may be configured to provide status updates indicating a duration of each period of use of the equipment 110 (and/or a start and stop time of each period of use). The status updates might be published (e.g., through the social networking infrastructure 115) and received by the back office system 130. The back office system 130 might then use the status updates to determine duration of use of the equipment 110 and create and/or update billing records accordingly.

Figure 3:
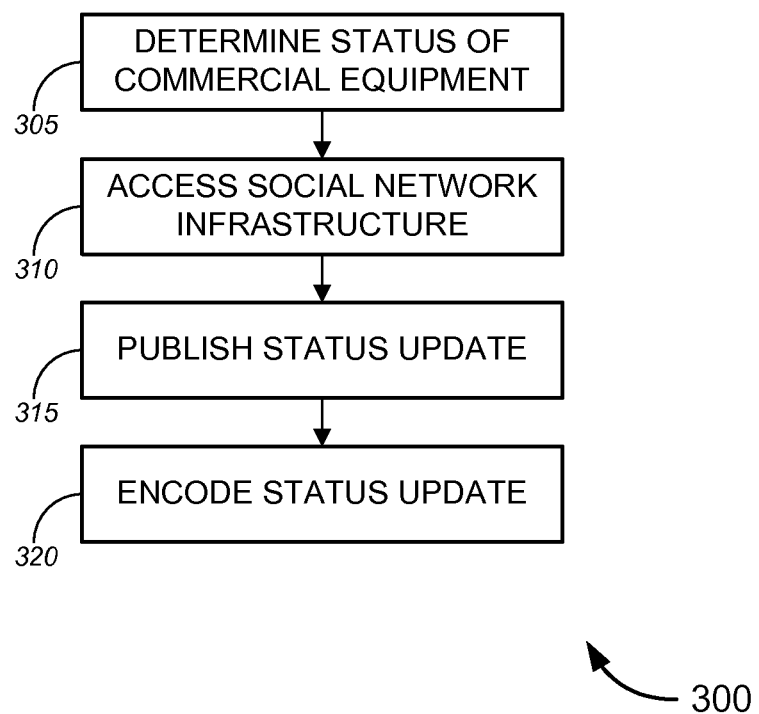
FIG. 3 is a process flow diagram illustrating a method of publishing status updates, in accordance with various embodiments.
Figure 4:
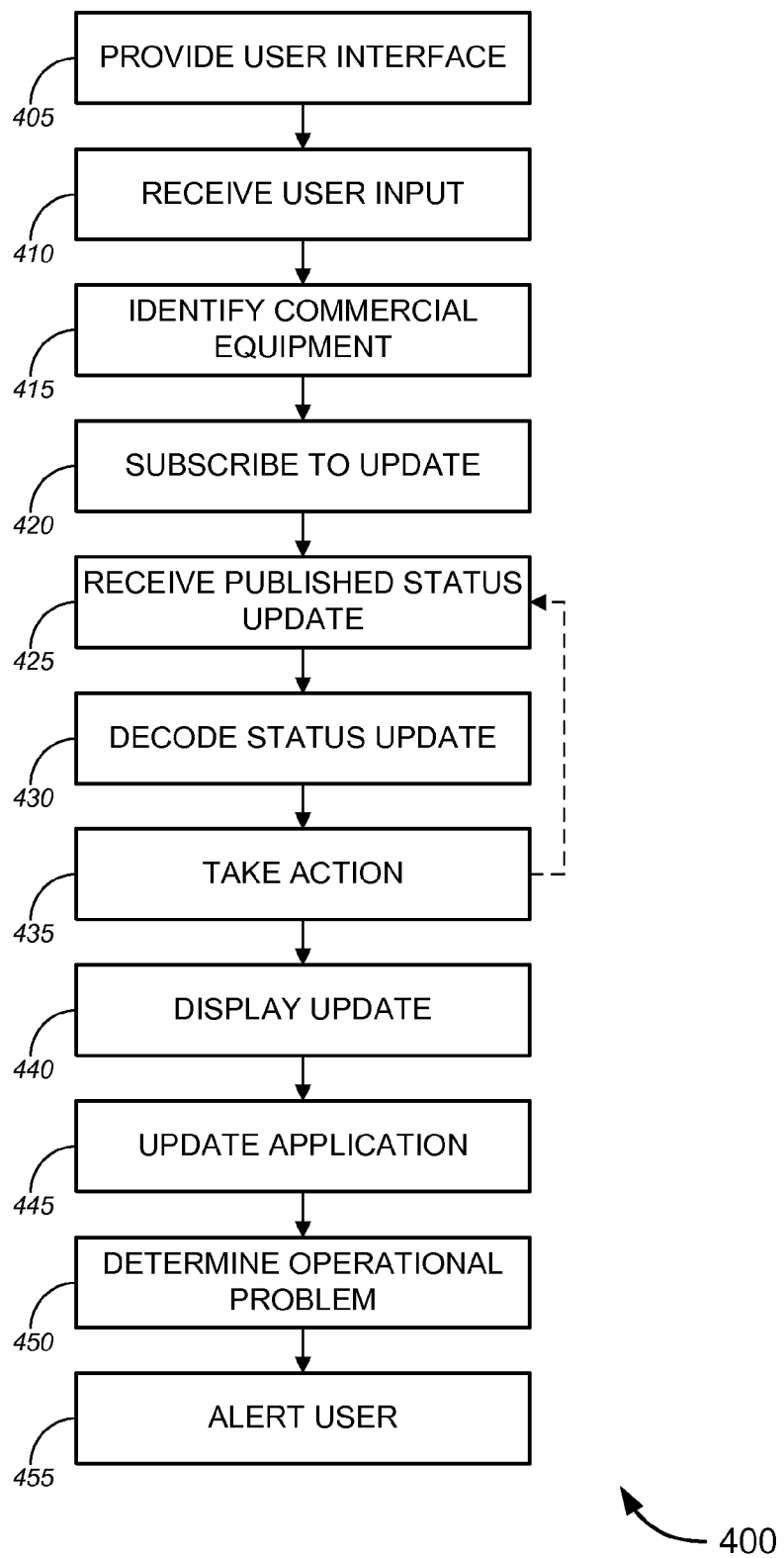
FIG. 4 is a process flow diagram illustrating a method of receiving published status updates, in accordance with various embodiments.

FIGS. 3 and 4 illustrate various methods that can be used to provide equipment status updates in accordance with various embodiments. While the methods of FIGS. 3 and 4 are illustrated, for ease of description, as different methods, it should be appreciated that the various techniques and procedures of these methods can be combined in any suitable fashion, and that, in some embodiments, the methods depicted by FIGS. 3 and 4 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 3 and 4 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 3 and 4 (e.g., by executing instructions embodied on a computer readable medium), the system 100 can also operate according to other modes of operation and/or perform other suitable procedures.

FIG. 3 is a process flow diagram illustrating a method 300 of publishing status updates, in accordance with various embodiments. In one aspect, one or more operations of the method 300 might be performed by a status monitoring device as described above.

The method 300 comprises determining a status of a piece of commercial equipment. In accordance with various embodiments, determining the status of a piece of commercial equipment can involve any of a number of operations. In some cases, a status monitoring device receives data from a sensor and/or from the commercial equipment itself, for example as described above. In the description of the method 300, any reference to the term "status monitoring device" should be interpreted to refer not only to the exemplary device described with respect to FIG. 2, but more generally to any computer system that can perform the monitoring and communication functions described herein with respect to a status monitoring device; such a device may or may not be integrated with the commercial equipment itself.

Based on this data, the status monitoring device can determine the status of the equipment. In some cases, determining the status of the equipment can comprise analyzing the data received from the sensors against one or more criteria and/or interpreting the data received from the sensors. In an aspect, these operations can be performed by the status monitoring device, which is programmed with instructions (e.g. firmware, software, etc.) to process the sensor data in order to derive the status of the equipment from the received data. As described above, a variety of parameters or characteristics of the commercial equipment can be monitored. Such parameters or characteristics can include, without limitation, positional information (e.g., location of the equipment, velocity and/or direction of movement of the equipment, etc.), operational information about the equipment (e.g., whether the equipment is in operational state, any operational parameters pertaining to the efficiency and/or efficacy of equipment, and/or the like), usage information about the equipment (e.g., whether the equipment is in use, how long the equipment has been in use—or not in use—a time at which usage of equipment began or ended, etc.), and virtually any other type of information that is subject to change over time and/or can be monitored. The status of the commercial equipment can depend on any such monitored information.

Thus, it should be appreciated that the status of the equipment is often context-dependent; for example, if the location of the equipment is of interest, the status of the equipment might be the equipment's current location and/or whether the equipment has moved over particular window of time (e.g. since a prior status update). By contrast, if the operability of the equipment is of interest, the status of the equipment might be whether the claimant is currently in operation and/or operational, or whether the equipment is experiencing any problems that prevent proper operation. As another example, if usage of the equipment is of interest, the status of the equipment can include whether and for how long the equipment is in use or has been used over a particular window of time (e.g., since a prior status update). Thus, determining the status of the commercial equipment can include any of a number of operations that receive and/or process information about the commercial equipment to identify any characteristics of the equipment at the time of the status update (and/or any changes in such characteristics). It should be noted that multiple characteristics of a particular piece of equipment might be monitored and/or reported as status updates: for example, with respect to a vehicle, the status monitoring device (or multiple status monitoring devices) might track (and report) positional information about the vehicle, usage information about the vehicle, and operational information about the vehicle.

From this status information, the status monitoring device can generate a status update. In many cases, the generation of the status update will involve distilling the received data into a set of content (e.g., a block of text, etc.) that meets the requirements of the social networking infrastructure that will be used to publish the status updated. (One skilled in the art will appreciate that many social networking infrastructures restrict the amount of information that can be conveyed—for example, SMS messages and Twitter messages are limited to a specified number of alphanumeric characters.) In many cases, the sensor data will exceed this capacity (and reporting a direct feed from a sensor would not be helpful in any event), so the status monitoring device may be configured to assimilate the received data into a brief, comprehensible summary. For example, input from a position sensor (e.g., a GNSS sensor) might include coordinates and a time stamp. The status monitoring device might receive multiple inputs from the position sensor over a period of time and process those inputs to produce a status update that reads "<date> <time>: <current location>, <velocity>," (for example, "2011-08-01 02: Pos 40-00'12"N 105-15'40"W, Vel 43 mph NW").

In certain situations, the information to be conveyed in a status update might exceed the limitations imposed by the social networking infrastructure. In such situations, generating a status update might include additional operations. Merely by way of example, the status monitoring device might split the status update into multiple portions, each of which is within any applicable limitations imposed by the social networking infrastructure, in order that the status update can be published as multiple, separate posts or communications via the social networking infrastructure. In other cases, for example, if the status update includes rich content (e.g., images, audio, and/or video) or sufficient text to render multiple posts undesirable, generating the status update might include posting the content to a website or other hosting location, obtaining a URL for accessing the posted location, and including that URL in the status update to be published over the social networking infrastructure.

The method 300 further comprises accessing a social networking infrastructure. In an advantage of certain embodiments, the use of a social networking infrastructure as an information transport can avoid the need to implement expensive proprietary systems to communicate between equipment and entities (e.g., users, monitoring systems, etc.) responsible for monitoring status of that equipment. In an aspect, then, a status monitoring device (or the computer system responsible for publishing status updates) can implement standard communication techniques and/or protocols to access the social networking infrastructure in order to publish status updates. Merely by way of example, in some cases status monitoring device will communicate over a public network and/or combination of networks (e.g., direct communication with a wireless access network that provides access to the Internet) using a standard protocol (e.g. Internet protocol and/or any of the derivative protocols that use Internet protocol as a base transport). Thus, accessing the social networking infrastructure can include using IP communication to establish communication with a hostname, IP address, etc. that serves as an interface for the social networking infrastructure to receive posts (or any other form communication that is used to communicate over that particular social networking infrastructure).

In some cases, accessing the social networking infrastructure might further include any operations necessary to identify the status monitoring device (and/or the equipment itself) to the social networking infrastructure, so that the status update to be published will be associated with the correct device/equipment. This identification procedure might include authentication and/or authorization (using any of a variety of well-known authentication/authorization techniques) in order to prevent the publication of counterfeit status updates.

At block 315, the method 300 comprises publishing a status update using the social networking infrastructure. In an aspect, the status update serves to report on the tracked characteristics of the monitored equipment; thus, the status update can indicate the status of the piece of commercial equipment. Publishing a status update, then, can include any operations necessary to communicate with the social networking infrastructure in order to post (or otherwise communicate) the status update using the social networking infrastructure. It should be appreciated that such operations generally will vary depending on the selected social network infrastructure. Merely by way of example, in some cases, the status update can be published by sending an e-mail message to an address designed to receive communications to be published over the social working infrastructure. In other cases, the status update might be sent as an SMS message over a cellular network, either to a set of phone numbers (or SMS gateways) that the status monitoring device maintains in a distribution list or to a particular telephone number (or SMS gateway) that is used to forward the status updates to subscribers. In still other cases, status update might be posted using appropriate HTTP communications to a web server that maintains the social networking infrastructure (and/or serves as a communication gateway thereto), for example, in the case of a blog or microblog. Thus, depending on the nature of the social network infrastructure, any necessary operations can be performed to communicate the status update using the standard procedures supported by that infrastructure.

In some cases, the method 300 might include encoding the status update (block 320) when generating (and/or prior to publishing) the status update. Any encoding scheme (including any of several well-known encoding schemes) can be used to encode the status update, and the nature of the encoding scheme selected often will depend on the purpose for the encoding. Merely by way of example, in some cases, status updates may be published using a public social networking infrastructure; however, the status updates might include confidential or sensitive information that should not be available for public inspection. In such cases, encoding the status update can include encrypting the status update (e.g., using any of a number of available encryption technologies). In other cases, a status update might be encoded for efficient transmission. For example, the status monitoring device and any receiving devices might share a common set of codes that serve as indicators for various status conditions (such as normal operation, particular trouble conditions, and/or the like), and the information in a status update can be encoded at the status monitoring device to provide for compact transmission in a status update and decoded at the receiving device for display to the user.

FIG. 4 is a process flow diagram illustrating a method 400 of receiving published status updates, in accordance with various embodiments. In some embodiments, various operations of the method 400 can be performed by a client computer and/or a back office computer.

The method 400 comprises, in some embodiments, providing a user interface (block 405) to allow interaction between a user and the client computer. For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

Figure 5:
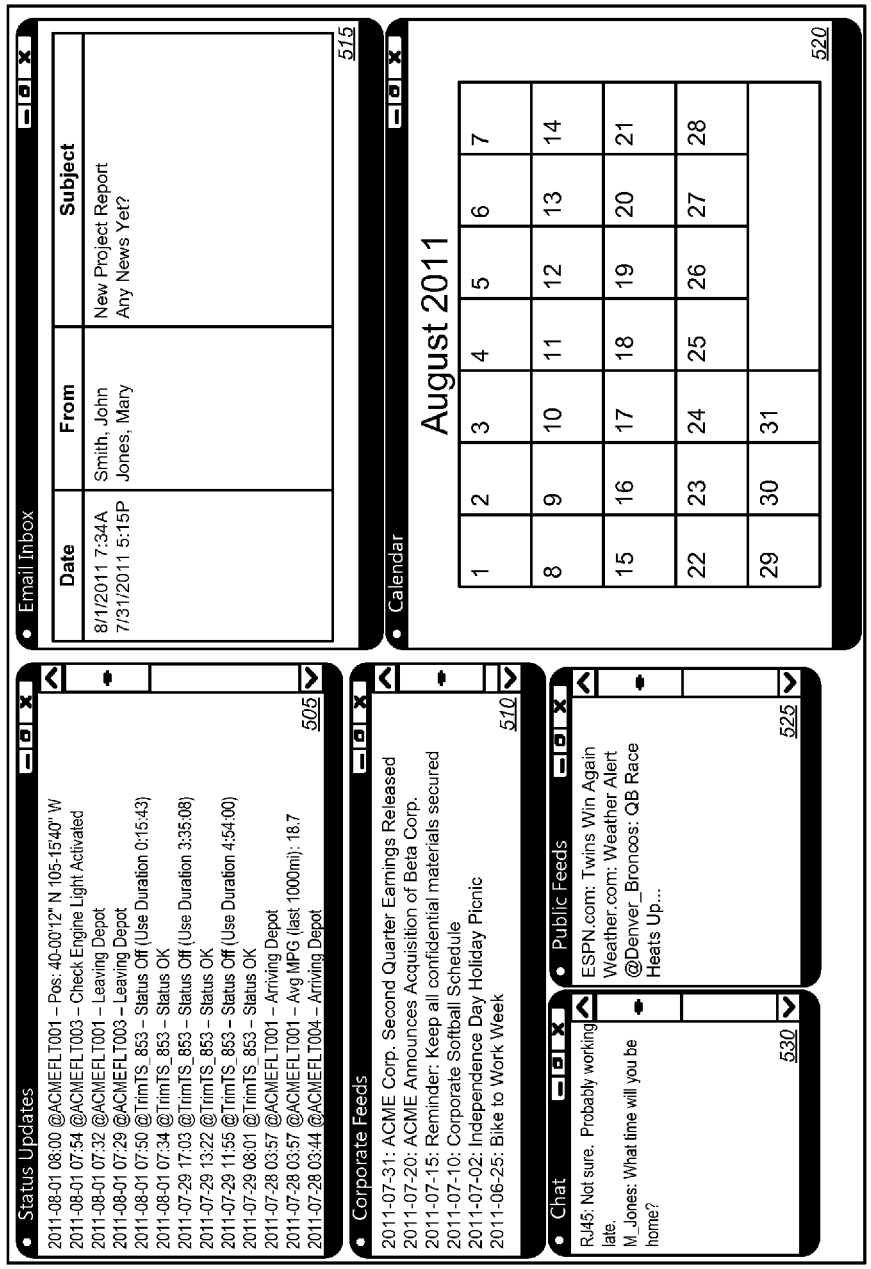
FIG. 5 is an exemplary display screen on which status updates can be displayed, in accordance with various embodiments.

In many cases, providing a user interface will comprise providing one or more display screens (such as, merely by way of example, the corporate dashboard environment described with respect to FIG. 5), each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface displays status updates in accordance with the procedures described in further detail below.

At block 410, the method 400 comprises receiving user input, e.g., via the user interface at a client computer. A variety of different types of user input can be received in accordance with different embodiments. Merely by way of example, in some cases, the user input will indicate a desired configuration of a corporate dashboard environment, as described in further detail below. In a particular case, however, the user input will identify one or more pieces of commercial equipment for which the user would like to receive status updates. The nature of this user input can vary by implementation. Merely by way of example, in some cases the user interface might provide a list of all monitored pieces of commercial equipment, and the room put my include one or more selections from that list. In other cases, the user input might be text input indicating an identity of the piece of equipment (which may correspond to identifier on the applicable social networking infrastructure, such as a user ID, wireless phone number, etc.). Merely by way of example, if Twitter is the selected social networking infrastructure, the user input might indicate that the user would like to "follow" a particular user ID associated with the commercial equipment these would like to monitor (and/or the status monitoring device associated with that equipment).

The method 400, in some embodiments, further comprises identifying a piece of commercial equipment for which the user would like to receive status updates (block 415). In some cases, the identification of the commercial equipment is based on the received user input. In other cases, the commercial equipment might be identified automatically (e.g., based on the user's role within a company, etc.) and/or based on configuration by an administrator, etc.

At block 420, the method 400 comprises subscribing to updates from the piece of commercial equipment. The procedure used to subscribe to updates often will depend on the nature of the social networking infrastructure used to publish the status updates. Returning again to the example of Twitter, subscribing to updates from a piece of commercial equipment might comprise logging into the user's Twitter account and indicating that the user would like to "follow" the username (or "handle") associated with the equipment (and/or its status monitoring device). In other cases, subscribing to updates might comprise subscribing to an RSS feed used to publish the updates. In still other cases (for example, if the updates are published as SMS messages), subscribing to the updates might comprise contacting the status monitoring device itself and requesting that the user (and/or a telephone number for the user and/or for an SMS gateway accessible by the user) be added to a distribution list to which updates are sent; alternatively, if the status monitoring device is configured to send updates to a particular SMS gateway that forwards the updates, subscribing to updates might comprise requesting such updates from the forwarding gateway. In any case, the client computer might be configured to perform these subscriptions automatically, based on the identification of the equipment.

At block 425, the computer system receives a published status update (e.g., via the social networking infrastructure through which the update was published). As with other operations described herein, the way in which the status updates are received can depend on the nature of the client software and the social networking infrastructure itself. Merely by way of example, in some cases, the social networking infrastructure might be designed to "push" updates to clients that have subscribed. In other cases, the client software might be configured to poll the social networking infrastructure (e.g., periodically, on an interval that ensures that updates are received in timely fashion).

If necessary, the status update is decoded (block 430). As noted above, the status update might be encoded and/or encrypted prior to publication, and the client computer can perform the inverse operation (e.g., decoding and/or decrypting the status update) upon receiving the published update.

In some cases, the method 400 will include taking one or more actions in response to receiving the status update (block 435). As illustrated by the broken line in FIG. 4, the operations of receiving and/or decoding a status update, along with taking any appropriate action, generally will be repeated as new status updates are published, either by the same equipment (or associated status monitoring device) or by different pieces of equipment (or associated status monitoring devices) to which the user has subscribed.

In accordance with different embodiments, a number of different actions can be taken upon receiving the status update. Merely by way of example, the method 400 might include displaying the status update for a user (block 440). Status updates can be displayed in many different ways, depending on the embodiment. Merely by way of example, in some cases, the status updates might be displayed in a chronological (or reversed chronological), textual list in a web browser or client software.

In other cases, particularly when the status updates include location information, displaying a status update might comprise displaying the current location of the equipment on a map. For example, the location information in the status update might be expressed as a street address and/or a set of coordinates (e.g. latitude/longitude coordinates). The client computer, therefore, might be configured to identify an appropriate map image that includes the location indicated by the status update (e.g., using any of a variety of well-known and/or commercially available techniques), display that map image, and display the current location of the equipment as an overlay on the map image. This overlay might include an icon indicating the location of the equipment, a legend or key identifying the equipment itself, a textual identification of the location, and/or the like.

In some cases, as subsequent status updates, indicating updated locations of the equipment, are published and/or received, displaying the status update can include updating the displayed map to show the current location of the equipment in each instance. If desired, historical locations of the equipment (e.g., as indicated in prior status updates and/or is determined by other techniques) can be indicated on the displayed map as well, illustrating for the user a travel path of the equipment.

Similarly, if the client computer has subscribed to status updates from multiple pieces of equipment (e.g., vehicles) that publish location updates, the map display can be configured to display locations of each of the tracked vehicles (or other equipment). In such cases, the display may be configured to distinguish between each vehicle and/or piece of equipment using different colors, icon shapes, and/or other visual distinctions. Thus, if the client receives multiple status updates from vehicles (e.g., within a fleet of vehicles), the system can display each of the status updates for the user (as indicators on a map, as a textual list of updates, etc.)

In a particular embodiment, the client computer can be configured to display a corporate dashboard environment, and displaying the status updates (e.g., as text, as a map, etc.) can including displaying the status updates as part of the corporate dashboard environment. In some cases, the corporate dashboard environment might be provided by a dedicated application. In other cases, the corporate dashboard environment can be provided served as a web page and displayed in a web browser at the client computer. In one aspect, the corporate dashboard environment is configured to consolidate a variety of different types of information for the user. Thus, in particular embodiments, the corporate dashboard environment might comprise a plurality of information panels, one (or more) of which can be used to display status updates.

Merely by way of example, FIG. 5 is an exemplary display screen on which status updates can be displayed, in accordance with various embodiments. The display screen, as illustrated, displays a corporate dashboard environment 500. The environment 500 can include a plurality of information panes. For example, as illustrated, the environment 500 includes a status update panel 505, which displays equipment status updates as they are received. Thus, as a plurality of status updates are received, the status update panel 505 is updated to display those status updates, without requiring any interaction from the user. As illustrated, the status update panel 505 is configured to display the time of each update and the source of the update (indicated by an "@" character in the illustrated embodiment), and the status update panel is configured to display the status updates in reverse chronological order, so that the newest updates are displayed at the top of the list. (It should be appreciated, of course, that these design choices are discretionary, and that other implementations might use different display techniques and/or allow the user to configure the display of the status updates.)

The environment 500 might also include an information panel 510 for displaying corporate information, which can include information that is published by (and/or otherwise obtained from) internal corporate sources and/or pertains to corporate interests. In some cases, the corporate information panel 510 is configured to provide access to (and to display) secure corporate information (using appropriate authentication and/or authorization techniques to access secure corporate information sources).

In some cases, the environment 500 can include an email inbox panel 515 and/or a calendar pane 520, which might be populated with data from a mail server, calendar server, etc. These components might be configured to operate as standard mail and/or calendar clients, as known in the art. In a particular embodiment, the environment 500 might include an information panel 525 to display public information (e.g., from a public social network) and/or an information panel 530 that provides a chat or instant messaging interface. Such panels might be configured to operate as standard social networking, newsreader and/or chat/messaging clients as known in the art.

In an aspect of some embodiments, the information panels 505-530 are implemented as dashboard widgets. In such cases, the information panels 505-530 might be customizable by the user. For example, the user might be given the option (e.g., through the user interface) to provide user input on which of a plurality of panels (of which the illustrated panels might be a subset) the user would like to display, how such panels should be sized and arranged, what information should be included in (or excluded from) each panel, and/or the like.

Returning to FIG. 4, taking an action in response to the status update might include updating a back office application (block 445) based on the status update. As noted above, for example, this operation can include updating a database with information from a status update, modifying data in a back office application itself, and/or the like.

In some cases, taking an action might comprise determining an operational problem with the commercial equipment (block 450). Merely by way of example, the client software might be configured to parse the status update (perhaps as part of the decoding process) to identify any indicators of a problem with the monitored equipment. If the status update indicates that the equipment is not fully operational (or is not in use when expected to be in use), and/or if the status update includes a maintenance request, error code, or other indication of an error condition, the client software could be configured to identify such information as indicating an operation problem with the equipment. Alternatively and/or additionally, the client software might be configured with threshold values indicating a normal operating range of a monitored equipment parameter (such as operating temperature, to name one example), and if a status update indicates a value of that parameter that falls outside the normal operating range, the client software might identify that value as indicating an operational problem. (In some cases, there might be a plurality of ranges of values defined. Merely by way of example, for a particular parameter for a piece of equipment, the client software might define a normal operating range, an abnormal operating range, and a critical range, and the software might be configured to determine, based on a value in the status update, whether the operational status of the equipment is normal, abnormal or critical.)

The method 400 can further include alerting the user to the operational problem with the equipment (block 455). This alert can be accomplished in a number of ways. Merely by way of example, in some cases, the display of the status update might be modified to indicate an alert (by changing the color, typeface, etc. of the displayed update). In other cases, the system might be configured to send an email message to the user or another person (or place a message in an email inbox within a corporate dashboard environment). In other cases, the system might send a text/SMS message to a user. Any of a variety of modes can be used to alert the user to the operational problem with the equipment.

As another example of taking an action in response to receiving a status update, a computer system might be configured to add the status update (or the information therein) to a visual organizer system, such as the visual organizer system disclosed in commonly-assigned U.S. patent application Ser. No. 12/894,845, filed Sep. 30, 2010 by Darby et al. That application discloses, inter alia, techniques and systems to organize information via associated geospatial data. Status updates received by a computer system as disclosed herein could be used as input data for such techniques and systems. Alternatively and/or additionally, as noted above, a tool such as the disclosed visual organizer could be considered a back office application, as that term is used herein.

FIG. 6 provides a schematic illustration of one embodiment of a computer system 600 that can perform the methods provided by various other embodiments, as described herein, and/or can function as a server computer system, a client computer, a status monitoring device, and/or the like. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
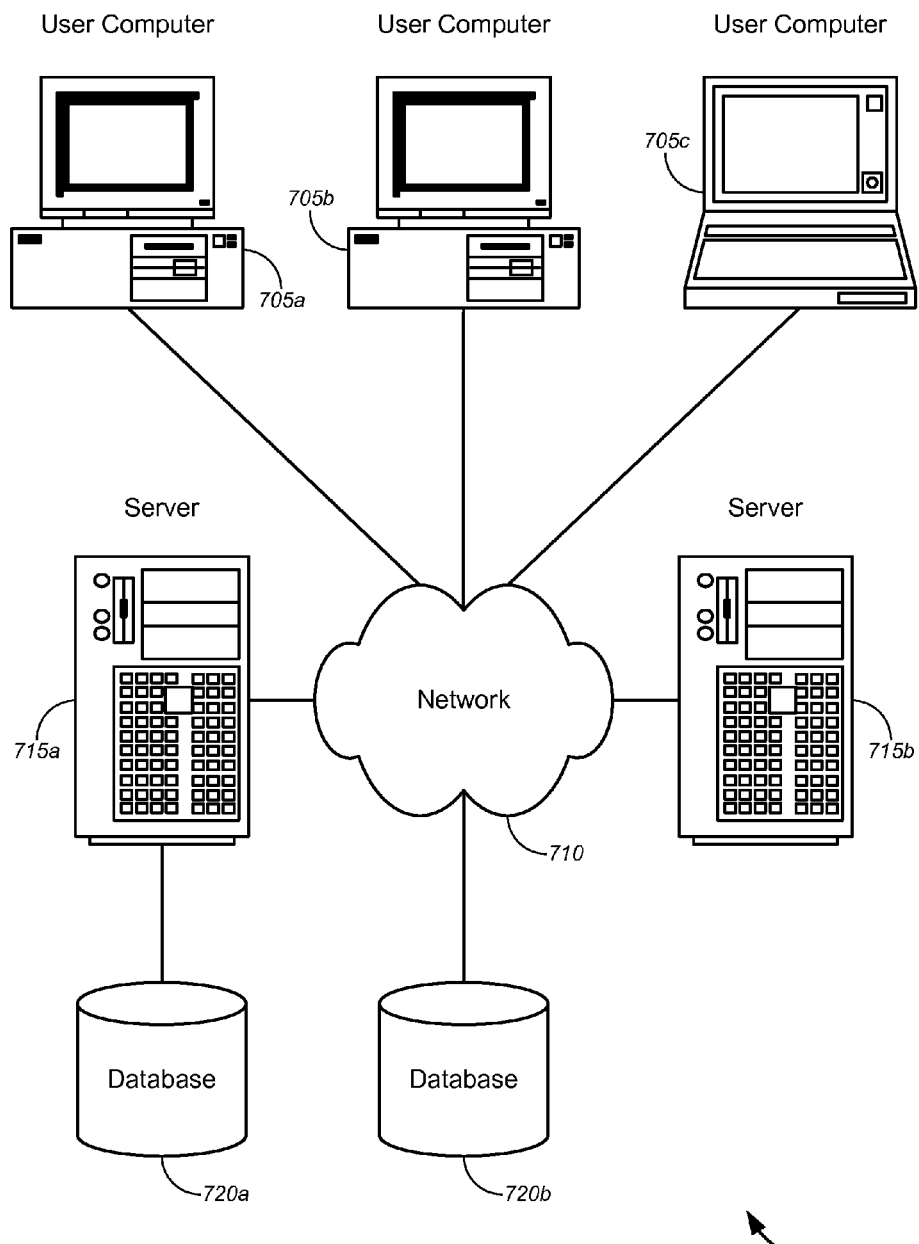
FIG. 7 is a block diagram illustrating a networked system of computers, which can be used in accordance with various embodiments.

As noted above, a set of embodiments comprises systems for providing equipment status updates. FIG. 7 illustrates a schematic diagram of a system 700 that can be used in accordance with one set of embodiments. The system 700 can include one or more user computers 705, which can serve as the client computers 125 described in conjunction with FIG. 1. A user computer 705 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 705 can also have any of a variety of applications, including one or more applications configured to perform methods provided by various embodiments (as described above, for example), as well as one or more office applications, database client and/or server applications, and/or web browser applications. Alternatively, a user computer 705 can be any other electronic device, such as a thin-client computer, Internet-enabled mobile telephone, and/or personal digital assistant, capable of communicating via a network (e.g., the network 710 described below) and/or of displaying and navigating web pages or other types of electronic documents. Although the exemplary system 700 is shown with three user computers 705, any number of user computers can be supported.

Certain embodiments operate in a networked environment, which can include a network 710. The network 710 can serve as the network 120 of the system 100 described in conjunction with FIG. 1 and can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 710 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 can serve as a back office system in accordance with various embodiments. In other cases, one of the servers 715 might host the social networking infrastructure and/or might be a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 705 and/or another server 715. In some embodiments, an application server can create web pages dynamically for displaying the information in accordance with various embodiments, such as displaying a corporate dashboard environment and/or displaying status updates. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 735 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system, comprising:
   a sensor system that detects a status of a piece of commercial equipment, the piece of commercial equipment comprising a surveying instrument;
   a first computer system, the first computer system comprising a first processor and a first computer readable storage medium having encoded thereon a status monitoring component to program the first computer system to perform one or more operations, the status monitoring program including a first set of instructions executable by the first processor, the first set of instructions comprising:
      instructions for receiving status information from the sensor system;
      instructions for determining the status of the piece of commercial equipment based at least in part on the status information; and
      instructions for encoding and publishing a status update, using a social networking infrastructure, the status update indicating the status of the piece of commercial equipment; and
   a second computer system comprising a second processor and a second computer readable storage medium, the second computer readable storage medium having encoded thereon a status update component to program the second computer system to perform one or more operations, the status update program including a second set instructions executable by the second processor, the second set of instructions comprising:
      instructions for receiving user input identifying the piece of commercial equipment;
      instructions for subscribing to updates from the piece of commercial equipment;
      instructions for receiving the published status update via the social networking infrastructure, based on a subscription to the piece of commercial equipment;
      instructions for decoding the published status update;
      instructions to identify, from the status update, any indicators of an operational problem with the monitored equipment;
      instructions for taking an action in response to receiving the published status update by displaying the status update for the user on a display screen equipped with a plurality of customizable information panels, wherein at least one of the plurality of information panels displays a calendar of the user;
   wherein the second set of instructions further comprises:
      instructions for receiving a plurality of published status updates via the social networking infrastructure; and
      instructions for displaying each one of the plurality of status updates in the first information panel, as that one of the plurality of status updates is received, without any interaction from the user;
   wherein encoding the status update comprises encrypting the status update, to prevent public access to information about the status of the piece of commercial equipment, and wherein decoding the published status update comprises decrypting the published status update.

2. The system of claim 1, wherein the social networking infrastructure is a blog or microblog, and wherein publishing the status update comprises: posting an entry on the blog or microblog.

3. The system of claim 1, wherein the social networking infrastructure is a public social network infrastructure.

4. The system of claim 1, wherein the social networking infrastructure is a private social network infrastructure that is not accessible to the public.

5. The system of claim 1, wherein the instructions for taking an action in response to receiving the status update comprise: instructions for updating a back office application with the status update.

6. The system of claim 1, wherein the sensor system comprises a location sensor.

7. The system of claim 1, wherein the sensor system and the first computer system are incorporated within the first piece of commercial equipment.

8. The system of claim 1, wherein the status update comprises information about a duration of operation of the piece of commercial equipment.

9. The system of claim 1, wherein the status update comprises information about an operational status of the piece of commercial equipment and the operational status is indicated as normal, abnormal or critical.

10. The system of claim 1, wherein the second computer system is a mobile communication device.

11. The system of claim 1, wherein the instructions for publishing the status update comprise instructions for accessing the social networking infrastructure using Internet protocol communication via a public network.

12. The system of claim 11, wherein the public network comprises a wireless network.

13. The system of claim 1, wherein the status update comprises location information about a current location of the piece of commercial equipment.

14. The system of claim 13, wherein the second set of instructions further comprise instructions for displaying, for a user, the current location of the piece of commercial equipment.

15. The system of claim 14, wherein the instructions for displaying the current location of the piece of commercial equipment comprise instructions for displaying a map illustrating the current location of the piece of commercial equipment.

16. The system of claim 15, wherein the map further displays a plurality of historical locations of the piece of commercial equipment.

17. The system of claim 1, wherein the instructions for taking an action in response to receiving the status update comprise: instructions for determining the operational problem with the piece of commercial equipment when the status update indicates that the equipment is not fully operational or is not in use when expected to be in use, and/or when the status update includes a maintenance request, error code, or other indication of an error condition.

18. The system of claim 17, wherein the instructions for taking an action in response to receiving the status update further comprise: instructions for alerting the user to the operational problem with the piece of commercial equipment.

19. The system of claim 1, wherein the instructions for displaying the status update comprise: instructions for displaying a corporate dashboard environment comprising a plurality of information panels; and
    instructions for displaying the status update within a first information panel.

20. The system of claim 19, wherein the plurality of information panels comprises a second information panel for displaying an electronic mail inbox of the user.

21. The system of claim 19, wherein the plurality of information panels comprises a second information panel for displaying a chat application.

22. The system of claim 19, wherein one or more of the plurality of information panels are dashboard widgets that are customizable by the user.

23. The system of claim 19, wherein the instructions for displaying the corporate dashboard environment comprise instructions for displaying the corporate dashboard environment in a web browser.

24. The system of claim 19, wherein the instructions for displaying the corporate dashboard environment comprise instructions for displaying the corporate dashboard environment in a dedicated dashboard application.

25. The system of claim 19, wherein the plurality of information panels further comprises a second information panel for displaying secure corporate information; and a third information panel for displaying public information.

26. The system of claim 25, wherein at least a portion of the public information is received from a public social network.

27. A method, comprising:
    detecting, with a sensor system, a status of a piece of commercial equipment, the piece of commercial equipment comprising a surveying instrument;
    receiving, with a first computer system comprising a first processor, status information from the sensor system;
    determining, with the first computer system, the status of the piece of commercial equipment based at least in part on the status information;
    encoding and publishing, with the first computer system, a status update, using a social networking infrastructure, the status update indicating the status of the piece of commercial equipment;
    receiving, with a second computer system, user input identifying the piece of commercial equipment;
    subscribing, with the second computer system, to updates from the piece of commercial equipment;
    receiving, with the second computer system, the published status update via the social networking infrastructure, based on a subscription to the piece of commercial equipment;
    decoding, with the second computer, the published status update;
    identifying, with the second computer, any indicators of an operational problem with the monitored piece of commercial equipment;
    taking an action in response to receiving the published status update by displaying the status update for the user on a display screen equipped with a plurality of customizable information panels, wherein at least one of the plurality of information panels displays a calendar of the user;
    receiving a plurality of published status updates via the social networking infrastructure; and
    displaying each one of the plurality of status updates in the first information panel, as that one of the plurality of status updates is received, without any interaction from the user;
    wherein encoding the status update comprises encrypting the status update, to prevent public access to information about the status of the piece of commercial equipment, and wherein decoding the published status update comprises decrypting the published status update.

28. A non-transitory computer program product, comprising:
    a first non-transitory computer readable medium having encoded thereon a first set of instructions executable by a first processor, the first set of instructions comprising instructions for:
        receiving status information from a sensor system that detects a status of a piece of commercial equipment, the piece of commercial equipment comprising a surveying instrument;
        determining the status of the piece of commercial equipment based at least in part on the status information;
        encoding and publishing a status update, using a social networking infrastructure, the status update indicating the status of the piece of commercial equipment;
    a second non-transitory computer readable medium having encoded thereon a second set of instructions executable by a second processor, the second set of instructions comprising instructions for:
        receiving user input identifying the piece of commercial equipment;
        subscribing to updates from the piece of commercial equipment;
        receiving the published status update via the social networking infrastructure, based on a subscription to the piece of commercial equipment;
        decoding the published status update;
        identifying any indicators of an operational problem with the monitored equipment;

taking an action in response to receiving the published status update by displaying the status update for the user on a display screen equipped with a plurality of customizable information panels, wherein at least one of the plurality of information panels displays a calendar of the user;

receiving a plurality of published status updates via the social networking infrastructure; and displaying each one of the plurality of status updates in the first information panel, as that one of the plurality of status updates is received, without any interaction from the user;

wherein encoding the status update comprises encrypting the status update, to prevent public access to information about the status of the piece of commercial equipment, and wherein decoding the published status update comprises decrypting the published status update.

* * * * *